(No Model.)
R. M. RUCK.
HOOK OR SHACKLE.
No. 427,482. Patented May 6, 1890.
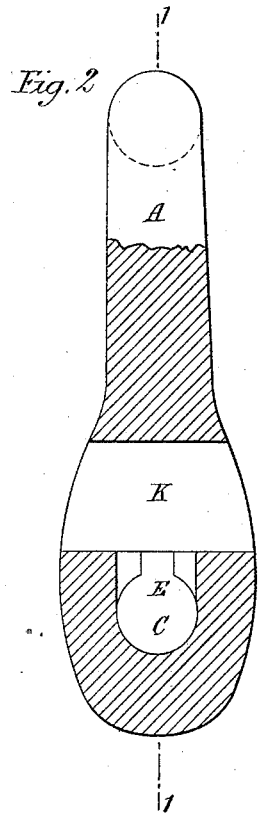
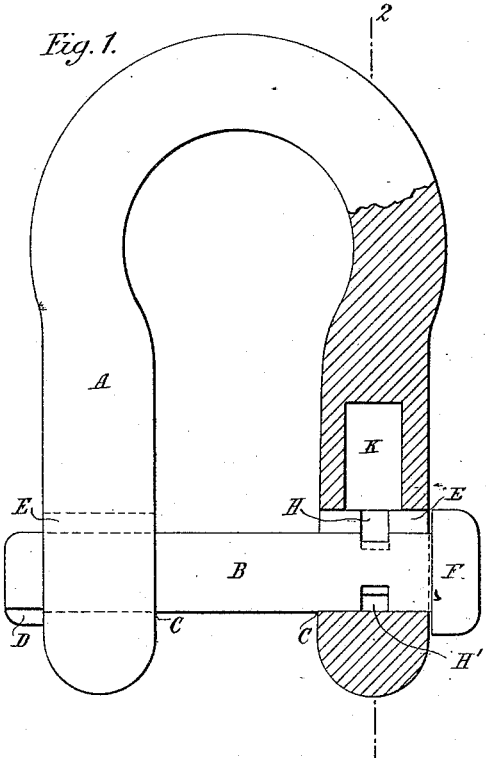
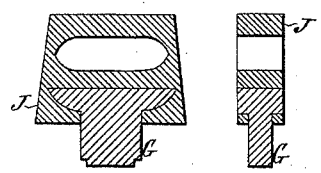
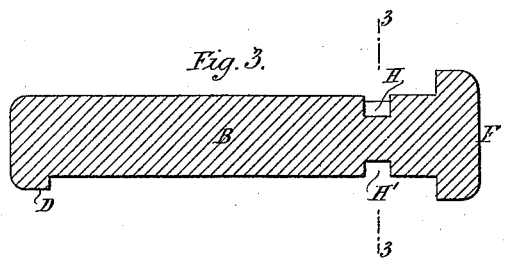
Witnesses.
C. W. Brooke
N. H. Smith
Inventor.
Richard Matthews Ruck
By his Atty's
Baldwin, Davidson & Wight

UNITED STATES PATENT OFFICE.

RICHARD MATTHEWS RUCK, OF SOUTH KENSINGTON, COUNTY OF MIDDLESEX, ENGLAND.

HOOK OR SHACKLE.

SPECIFICATION forming part of Letters Patent No. 427,482, dated May 6, 1890.

Application filed March 4, 1890. Serial No. 342,580. (No model.)

*To all whom it may concern:*

Be it known that I, RICHARD MATTHEWS RUCK, major R. E., a subject of the Queen of Great Britain, residing at 5 Roland Houses, South Kensington, in the county of Middlesex, England, have invented certain new and useful Improvements in Hooks or Shackles, of which the following is a specification.

This invention relates to that class of hooks or shackles which have a bolt with a spring-retaining piece of india-rubber inserted together into a slot in the body of the hook or shackle, such bolt being pressed forward by the india-rubber and engaging with the movable part of the hook or shackle, but nevertheless admitting of being drawn back by its ends projecting from the slot. Such hooks or shackles as heretofore made could not be opened until the strain on them had been relieved, and the bolt did not always work satisfactorily. According to my present invention for the movable part I employ a pin which passes through holes at the ends of the arms of the U-shaped body. The holes are circular with a projecting radial slot or keyway. The pin is cylindrical and of the same size as the holes. On one end there is a key or projection which in one position fits the slots and allows the pin to be withdrawn through the holes in one direction, while on the other end there is a disk which prevents the pin being withdrawn in the other direction. A spring-bolt is contained in a slot in one of the arms of the body, and its end enters a hole in the pin. When the hook or shackle is closed, the pin cannot be withdrawn until the projection on it is turned so as to coincide with the slot, and this cannot be done till the bolt is withdrawn.

My improved hook or shackle may be used to advantage for connecting the ring or loop of an anchor to a chain cable; but obviously it is not thus limited in its application.

In the accompanying drawings, Figure 1 is an elevation, partly in section, (on the line 1 1, Fig. 2,) of the hook or shackle with the spring-bolt removed. Fig. 2 is a section (on the line 2 2, Fig. 1) of the arm which carries the bolt. Fig. 3 is a longitudinal section of the pin. Fig. 4 is a transverse section (on the line 3 3, Fig. 3) of the pin. Fig. 5 is a longitudinal section of the spring-bolt. Fig. 6 is a transverse section of the spring-bolt.

A A is the body of the hook or shackle, and B is the pin, which passes through the holes C C at the ends of the arms. The pin B has projecting from it a key D, which fits into the keyways E. (Shown in Figs. 1 and 2.) This key D prevents the pin being withdrawn from the shackle unless the key coincides with the keyway. The pin B is also prevented from being withdrawn in the other direction by the head F, of larger radius than the holes C C. The pin B is locked in position by the bolt G, whose nose enters one or other of the holes or recesses H H' of the pin. As shown in Fig. 4, these holes are of different forms. When the bolt G is in H, the pin B can neither be turned nor withdrawn, while when it is in H', although the pin B cannot be withdrawn, it can be turned. The bolt G is embedded in india-rubber (or other elastic substances) J, as shown in Figs. 5 and 6, which forms a spring, forcing the bolt outward. The india-rubber J and bolt G fit into the slot K in the arm A. When it is desired to open the shackle, the india-rubber spring is pulled back with the finger and thumb, and thus the nose of the bolt G is withdrawn from the hole H in the pin B, so that the latter can be turned and withdrawn.

What I claim is—

1. The combination, with a hook or shackle having two arms, of a pin which fits holes at the ends of the arms, through which it passes, and is held in position by a spring-bolt placed in a slot or recess in one of the arms, the projecting nose of the bolt entering a hole or recess in the pin.

2. The combination, with a hook or shackle having two arms, of a pin which fits holes at the ends of the arms, through which it passes, and is held in position by a spring-bolt placed in a slot or recess in one of the arms, the projecting nose of the bolt entering a hole or recess in the pin, such pin being provided with a head at one end and a projection or key at the other end, which can pass through radial slots in the arms and allow the pin to be withdrawn.

3. The combination, with a hook or shackle having two arms, of a pin which fits holes at the ends of the arms, through which it passes, and is held in position by a spring-bolt placed in a slot or recess in one of the arms, the projecting nose of the bolt entering a hole or recess in the pin, such pin being provided with a head at one end and a projection or key at the other end, which can pass through radial slots in the arms and allow the pin to be withdrawn, and with two holes or recesses, one of which receives the end of the bolt in such manner that the pin can neither be turned nor withdrawn, while the other allows the pin to be turned, but prevents it from being withdrawn.

4. The combination, with a hook or shackle having two arms, of a pin which fits holes at the ends of the arms, through which it passes, and is held in position by a spring-bolt placed in a slot or recess in one of the arms, the projecting nose of the bolt entering a hole or recess in the pin, such spring-bolt consisting of a bolt proper embedded in a block of india-rubber or like compound which surrounds the base of the nose of the bolt which projects through a hole in the rubber block.

5. The combination, with a hook or shackle having two arms, of a pin which fits holes at the ends of the arms, through which it passes, and is held in position by a spring-bolt placed in a slot or recess in one of the arms, the projecting nose of the bolt entering a hole or recess in the pin, such pin being provided with a head at one end and a projection or key at the other end, which can pass through radial slots in the arms and allow the pin to be withdrawn, and with two holes or recesses, one of which receives the end of the bolt in such manner that the pin can neither be turned nor withdrawn, while the other allows the pin to be turned, but prevents it from being withdrawn, and such spring-bolt consisting of a bolt proper embedded in a block of india-rubber or like compound which surrounds the base of the nose of the bolt which projects through a hole in the rubber block.

RICHARD MATTHEWS RUCK.

Witnesses:
  STANHOPE HUMPHREY PEDLEY,
    21 *R. W. Kent Regt.*
  PHILIP PEDLEY,
    5 *Roland Houses, London, S. W.*